United States Patent
Brunner et al.

(10) Patent No.: US 10,099,696 B2
(45) Date of Patent: Oct. 16, 2018

(54) METHOD FOR OPERATING A DRIVE TRAIN HAVING A HYDRODYNAMIC CLUTCH

(71) Applicant: Voith Patent GmbH, Heidenheim (DE)

(72) Inventors: Stefan Brunner, Feuchtwangen (DE); Frank Hellinger, Künzelsau (DE)

(73) Assignee: Voith Patent GmbH, Heidenheim (DE)

( * ) Notice: Subject to any disclaimer, the term of this patent is extended or adjusted under 35 U.S.C. 154(b) by 198 days.

(21) Appl. No.: 15/079,756

(22) Filed: Mar. 24, 2016

(65) Prior Publication Data

US 2016/0264141 A1 Sep. 15, 2016

Related U.S. Application Data

(63) Continuation of application No. PCT/EP2014/067748, filed on Aug. 20, 2014.

(30) Foreign Application Priority Data

Sep. 24, 2013 (DE) .......... 10 2013 219 180

(51) Int. Cl.
*B60W 10/02* (2006.01)
*F16H 59/72* (2006.01)
(Continued)

(52) U.S. Cl.
CPC ........ *B60W 30/188* (2013.01); *B60W 10/023* (2013.01); *B60W 10/04* (2013.01);
(Continued)

(58) Field of Classification Search
CPC ............... B60W 10/023; B60W 10/029; F16D 2500/30405
See application file for complete search history.

(56) References Cited

U.S. PATENT DOCUMENTS

| 7,254,942 B2 * | 8/2007 | Frank | F16D 33/00 374/E13.01 |
| 2008/0033618 A1 * | 2/2008 | Kwon | B60W 10/023 701/54 |
| 2008/0234106 A1 * | 9/2008 | Maguire | B60W 30/186 477/169 |

FOREIGN PATENT DOCUMENTS

DE 10 2004 006 358 A1 9/2005
DE 10361453 B3 * 9/2005 ............. F16D 33/18
(Continued)

OTHER PUBLICATIONS

Notice of Transfer of International Research Report and the Written Notice Issued for International Searching Authority or Statement dated Aug. 6, 2015 for International Application No. PCT/EP2014/067748 (10 pages).

*Primary Examiner* — Tisha D Lewis
(74) *Attorney, Agent, or Firm* — Taylor IP, P.C.

(57) ABSTRACT

A method for operating a drive train by providing a primary drive machine, a working machine, a hydrodynamic clutch, and a temperature detection device; wherein at least in the case of a change from a load state and/or an operating state of the drive train thereby creating a new load state and a new operational state, the temperature of the hydrodynamic clutch is detected at the time of the change; wherein on the basis of the detected temperature and the new load state and/or the new operational state of the drive train, an expected temperature progression is calculated; and wherein a warning signal and/or a stop signal is issued for the primary drive machine if a temperature of the calculated temperature progression exceeds a predetermined maximum temperature within the expected duration of the new load state and/or the new operational state.

13 Claims, 7 Drawing Sheets

(51) Int. Cl.
*F16D 121/00* (2012.01)
*B60W 30/188* (2012.01)
*F16D 48/06* (2006.01)
*B60W 10/04* (2006.01)
*B60W 50/00* (2006.01)
*B60W 50/14* (2012.01)

(52) U.S. Cl.
CPC ........ *B60W 50/0097* (2013.01); *B60W 50/14* (2013.01); *F16D 48/06* (2013.01); *B60W 2510/0291* (2013.01); *F16D 2500/10487* (2013.01); *F16D 2500/3027* (2013.01); *F16D 2500/30404* (2013.01); *F16D 2500/30405* (2013.01); *F16D 2500/3122* (2013.01); *F16D 2500/70252* (2013.01); *F16D 2500/7101* (2013.01)

(56) References Cited

FOREIGN PATENT DOCUMENTS

| | | |
|---|---|---|
| DE | 10 2005 042 363 A1 | 3/2007 |
| DE | 10 2006 009 608 A1 | 9/2007 |
| WO | 03/087614 A1 | 10/2003 |

\* cited by examiner

METHOD FOR OPERATING A DRIVE TRAIN HAVING A HYDRODYNAMIC CLUTCH

CROSS REFERENCE TO RELATED APPLICATIONS

This is a continuation of PCT application No. PCT/EP2014/067748, entitled "METHOD FOR OPERATING A DRIVE TRAIN HAVING A HYDRODYNAMIC CLUTCH", filed Aug. 20, 2014, which is incorporated herein by reference.

BACKGROUND OF THE INVENTION

1. Field of the Invention

The invention relates to a method for operating a drive train having a hydrodynamic clutch, or respectively a turbo clutch.

2. Description of the Related Art

A drive train is known from the current state of the art. It consists typically of a primary drive machine that drives a working machine via a hydrodynamic clutch. It can be used for example in the field of industrial drive applications, in particular for driving of material conveyors, crushers, or similar applications.

A hydrodynamic clutch or respectively turbo clutch that can be driven in the drive train is known for example from DE 10 2004 006 358 B4. The turbo clutch described therein features a contactless temperature measuring device, so that above a predetermined maximum temperature, the primary drive machine that drives the working machine by way of the clutch is reduced in its efficiency or is in particular shut off.

The advantage when utilizing a contactless thermal measuring device according to the aforementioned German patent document is in particular, that the temperature measurement occurs directly in the operating medium and therefore temperature changes that always accompany load changes in the drive train can be very quickly recognized. Based on this direct availability of the temperature values and load states accompanying same, it becomes possible in particular, to accordingly warn the operator in various warning stages, so that the operator can reduce or completely eliminate the load before a thermal overload of the hydrodynamic clutch occurs.

A basic problem remains, however. For the event of dynamic changes of operating states or load states, in particular when the system had to be shut off due to a thermal overload of the hydrodynamic clutch, there is the danger that, in the event of a new start of the system a thermal overload occurs again very quickly, since a start of the line is always connected with a corresponding temperature rise in the hydraulic clutch. This temperature increase that occurs typically at the start can—in particular with a not yet sufficiently cooled off system—ensure that after the start an emergency shut-off occurs again very quickly, because a thermal overload of the hydrodynamic clutch occurs again. This presents a considerable disadvantage for the system user.

It is therefore the objective of the current invention to cite a method that improves the operation of a generic drive train and that, in particular avoids the aforementioned disadvantage.

SUMMARY OF THE INVENTION

It is now provided in the method according to the invention that—at least in the event of a change in the load state and/or operating state of the drive train—the temperature is detected via a temperature detection device. An expected temperature progression is then calculated on the basis of this detected temperature, as well as with the knowledge of the new load state, or respectively operating state of the drive train. This calculation or simulation of an expected temperature progression can then be used to issue a warning or stop signal for the primary drive machine if the temperature of the calculated temperature progression exceeds a predefined maximum temperature within the expected duration of the new load state and/or the new operating state.

The temperature control for the drive train is thus equipped with a certain "intelligence". The system is not stopped as was the case hitherto, based merely on exceeding a critical temperature. Rather, a projection of the expected temperature change is calculated always when a dynamic change occurs; for example when changing from a stopped state into a startup procedure, at the change from a startup procedure into the regular operation, the change from regular operation with load 1 to regular operation with load 2, and so on. In this projection of the expected temperature change the new state is included, in other words for example a startup state with the projected load at the time of shut-off, or in the event of a load change, the increased load.

As long as the calculated temperature progression remains below a predefined maximum temperature of the hydrodynamic clutch, no intervention occurs. If it approaches such a temperature, a warning signal may for example be issued that prompts the system user to, for example reduce the load. Only when it becomes clear that the maximum temperature of the calculated temperature progression will for certain exceed the maximum permissible temperature of the turbo clutch, a stop signal is triggered and the drive train is stopped.

In an additional very favorable arrangement of the method according to the invention it can moreover be provided that a warning signal and/or a stop signal for the primary drive machine is issued when the current temperature becomes greater than the corresponding value of the calculated temperature progression. Not only the projection and the reaction to the expected maximum temperature is possible with the method according to the invention. Rather, it is now possible to also track to what extent the behavior of the hydrodynamic clutch that is measurable by way of the current temperature is consistent with the projected temperature behavior. If this is the case—and there is always a certain safety distance between the values—no action is undertaken. If this is not the case and the current measured temperature value exceeds for example the projected temperature progression, then typically a fault occurs, for example a blockage of the drive train during the startup process. This can then be detected extraordinarily quickly and used to generate a warning signal or in particular a stop signal for the primary drive machine.

For the case of a change of the operating state from a turned on to a shut off state of the primary drive machine, it can now be provided in an additional exceptional arrangement of the method according to the invention that, based on the load state at the time of the shut-off, additionally a start-up temperature progression of a warm-up in the event of a start of the drive train is calculated. From this simulation of the temperature progression during the repeated start-up of the drive train under the same load that existed at the time of the stop, a maximum start-up temperature difference by which the drive train heats up in the event of a start-up can then be determined. Now, one can wait before release of a renewed start of the drive train until the calculated temperature progression of cooling has reached a release temperature that falls below the maximum temperature by at least the startup temperature.

This ensures that the hydrodynamic clutch is in a position to absorb the complete temperature increase that occurs during start-up, without thereby exceeding the maximum permitted operating temperature and to cause, for example, an emergency stop. The problem described at the beginning can thus be countered effectively.

It is thus possible that reaching the release temperature occurs by way of a comparison of the respectively current detected temperature with the corresponding value of the calculated temperature progression. An alternative thereto is also conceivable, wherein reaching the release temperature is monitored by a time counter. For this purpose, a time counter is started when shutting down the drive train. One then waits until the time counter has reached a time value that permits renewed starting, whereby the hydrodynamic clutch is cooled to a point that the startup temperature difference of the hydrodynamic clutch can again be detected. On the one hand this can occur through the already described simulation in such a way that the time value that has to be reached by the time counter is predefined by the temperature progression, namely as the time value at which the release temperature is reached. An alternative exists in accordingly predefining the time value—independent of such a calculation—by way of characteristic diagrams or respectively characteristic curves, subject to the temperature at the time of shut-off, as well the load of the drive machine.

If it is known for example from simulation or experience that with a predetermined load, the drive train heats during startup in the area of the hydrodynamic clutch by a temperature value of 50 K then, on the basis of the temperature at which the primary drive machine is shut off, a cool-down had to occur that led to a temperature value at least 50K below the maximum permissible operating temperature. Only then is the release signal set and the drive train restarted.

According to a very advantageous further development of the inventive method it may moreover be provided that, in a calculation of the temperature progression, the ambient temperature of the hydrodynamic component is considered. This is of decisive importance in particular for the cooling behavior of the hydrodynamic clutch, in other words for a dynamic change from operation into shut-off state, since it plays a decisive role in the cooling behavior and thus in determination of the release temperature, or respectively the duration until release temperature.

In an additional very favorable arrangement it may moreover be provided that the current temperature that is detected by the temperature detection device is corrected with a temperature value, subject to the occurring temperature gradient. Temperature measurements are frequently affected by a certain time delay. This applies also to the temperature measurement inside a hydrodynamic clutch, since the maximum temperature does not adjust itself at the time at which it was measured, but typically already before. Subject to the temperature gradient, the detected temperature value can therefore be corrected, thus improving the accuracy of the operating procedure. In one advantageous further development of this concept it is thus provided that the correction value progresses proportionally to the temperature gradient, since a more rapidly changing temperature requires a higher correction value.

In an additional very favorable arrangement of the inventive method it can now moreover be provided that, as of a maximum operating temperature the load on the hydrodynamic clutch is reduced by a decrease in a drive power and/or a load, wherein the maximum operating temperature is less than the maximum temperature. In this especially favorable and advantageous advancement a maximum operating temperature can be predefined, as of which a further temperature increase is countered with a decrease in the drive power and/or the load in order to avoid, if possible, an unnecessary shut-off and thereby an unnecessary down time of the drive train. In an additional very favorable arrangement of this concept it can now moreover be provided that a complete reduction of the load occurs at a warning temperature that is predefined greater than the maximum operating temperature and lower than the maximum temperature. With such a load reduction, a further temperature increase can be meaningfully countered. An emergency shut-off of the system due to exceeding the maximum temperature can thus possibly also be avoided, contributing in turn to an improved uptime of the drive train.

In an additional very advantageous arrangement thereof it may moreover be provided that the hydrodynamic clutch is protected by a fusible safety plug that is designed for a temperature above the maximum temperature. Such a fusible safety plug as is known for example for the current state of the art can be provided in any event. The fusible safety plug is ideally designed for a temperature value above the maximum temperature, so that in a meaningful functionality of the inventive method, it typically does not respond. It will only respond if the inventive method fails, for example if individual measured values cannot be detected, if the energy supply fails, or if other similar circumstances occur. At a temperature above the maximum temperature a separation of drive machine and working machine in the drive train is forced in this case by way of melting of the fusible safety plug and a therewith associated release of the working medium from the hydrodynamic clutch.

As already mentioned, the measurement of the temperature in the hydrodynamic clutch can occur via a measurement in the hydrodynamic clutch and a contactless transfer of the measured value into a stationary analysis unit. This structure, analogous to the German patent mentioned in the beginning is especially simple and efficient, since it can detect the temperature values in the hydrodynamic clutch or respectively in the working medium located in the hydrodynamic clutch very directly and exceptionally quickly. The hydrodynamic clutch may in principle be any type of hydrodynamic clutch—for example a hydrodynamic converter or, in particular also a hydrodynamic clutch or respectively a turbo clutch.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawing, wherein.

DETAILED DESCRIPTION OF THE INVENTION

Figure 1:
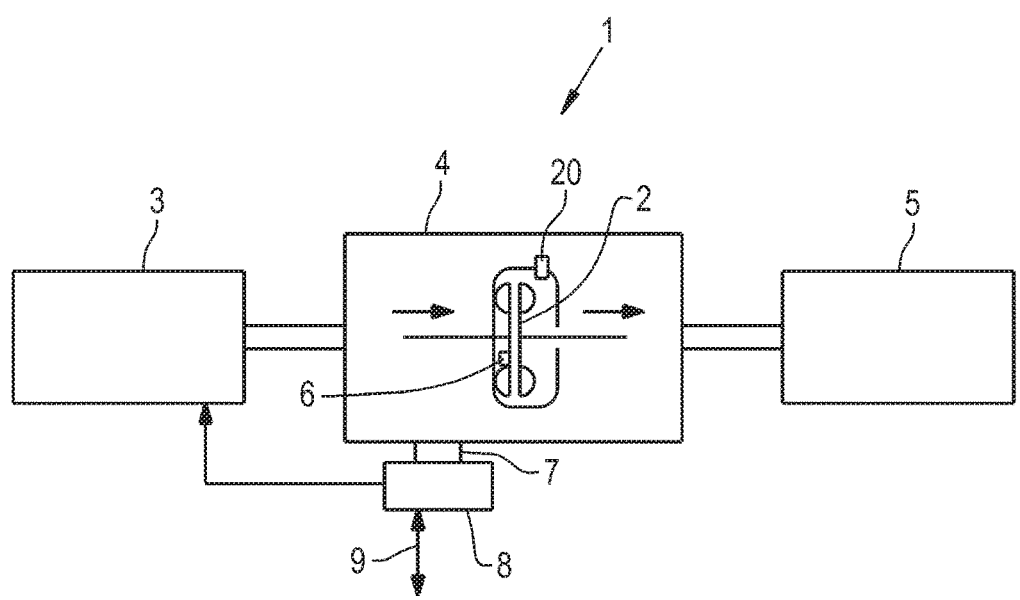
FIG. 1 illustrates a drive train according to the invention, with a hydrodynamic clutch, in particular a turbo clutch with which the inventive method can be realized.

The illustration in FIG. 1 is a highly schematized and merely exemplary illustration of a drive train. Drive train 1 is structured in such a manner that it includes a hydrodynamic clutch 2, in particular a turbo clutch (VTK). A working machine 5 is driven via a primary drive machine through an indicated transmission 4, wherein turbo clutch 2 can be part of this transmission 4 or can be an independent component in addition to a suchlike transmission, or is used in place of such a transmission 4. Working machine 5 may for example be a working machine 5 in the stationary region, in particular a material conveyor, a shredder or a similar machine. Turbo clutch 2 includes a contactless thermal measuring device 6 in the region of turbo clutch 2. Contactless thermal measuring device (BTM) 6 corresponds with a receiver 7 that is in corresponding contact with an analysis device (AWG) 8 or is part of such. A temperature signal that is sent by contactless measuring device 6 is accordingly evaluated by analysis device 8, and activation of primary drive machine 3, in particular of an electric motor can in particular occur. This is accordingly indicated by the arrows between analysis device 8 and primary drive machine 3. Analysis device 8 can at the same time receive signals from the outside, for example a start signal, or the like. This is indicated accordingly by double arrow 9. The opposite direction of double arrow 9 is meant to indicate that signals of analysis device 8 can be issued to the outside, for example warning signals of exceeding a predetermined temperature, or the like.

In the schematic diagram in FIG. 1 a fusible safety plug (SSS) 20 is moreover illustrated in the region of turbo clutch 2. This is generally known from the current state of the art and represents a final safety device that prevents overheating of turbo clutch 2 in that the working medium melts a fusible link and emits accordingly into the environment, causing the power transmission to be interrupted by the Vottinger-circuit in turbo clutch 2.

The inventive operational method for drive train 1 is described below with the assistance of an example of a dynamic change of an operational state, or respectively a load state. In this case only the operational state changes in as far as a change occurs from a shut-off operational state into an operational state of starting. Any other dynamic change is analogous so that, for the expert, this example for clarification of the inventive method is sufficient.

Figure 2:
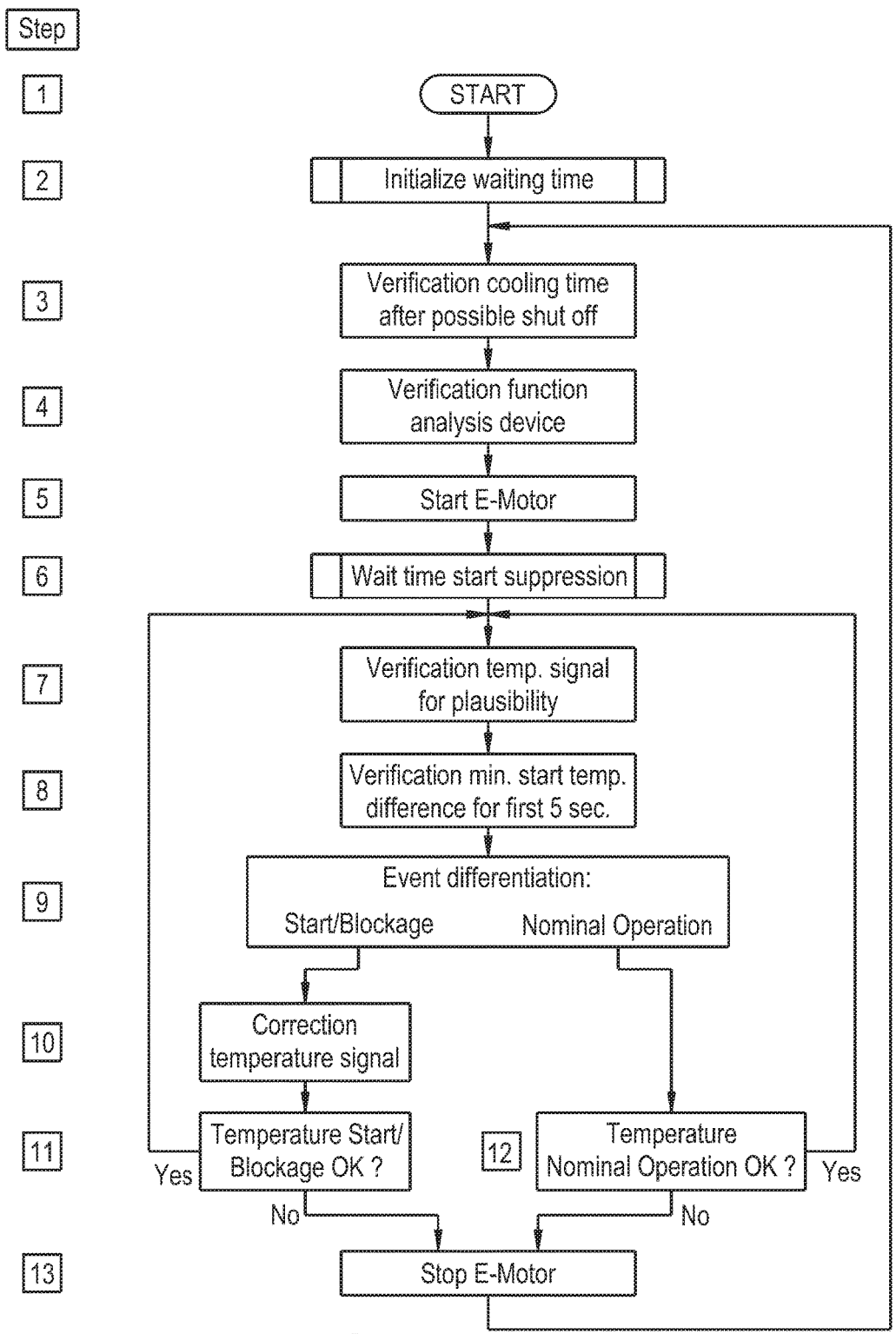
FIG. 2 is a simplified flow chart for the inventive method.

The illustration in FIG. 2 shows a simplified sequence for drive train 1, in particular for turbo clutch 2 of drive train 1. On the basis of a start signal given from the outside a correlative processing occurs, for example in the area of analysis device 8 that shows implementation of the logic steps. After a short waiting period for initiation, it is initially verified in the process sequence whether an appropriate cooling period was observed following a possible shut off due to exceeding a predefined maximum temperature, before proceeding in the process sequence. After verification of the function of analysis device 8, electric motor 3 is then started as primary drive unit 3. Then a short waiting period follows for suppression of startup prior to proceeding with a verification of the plausibility of the temperature signal of measuring device 6. Subsequently, a verification of the minimum required starting temperature difference for the first five seconds occurs, followed by a determination of whether there is a nominal operation or a startup or respectively a blockage. In the case of a startup or respectively a blockage, a correction of the temperature signal occurs which is not as necessary in the nominal operation. Subsequently, the temperature is compared with a predetermined maximum temperature, and the process sequence starts anew with a verification of the temperature signal in regard to plausibility if the temperature value is below the predetermined maximum temperature. If this is not the case, shutting off of the electric motor occurs, in other words an emergency shutdown of the system.

Subsequently, prior to a possible manually and/or automatically implemented renewed start of drive train 1, or respectively of electric motor 3, a verification of the cooling time following the possible shutdown due to exceeding of the predetermined maximum temperature is again conducted. Due to this verification of the cooling time and possibly the delay of the renewed start it is achieved that, based on the unavoidable starting temperature difference an emergency shutdown occurs again immediately, since the current temperature value plus the required starting temperature difference again exceeds the maximum temperature.

The sequence is described and demonstrated in detail with the assistance of FIGS. 3A to 3D, wherein for simplification of the illustration the following abbreviations and formula have been predefined:

Temperatures:

$1_{BTM}/\vartheta_{BTM}$: analogous BTM-output (4 mA . . . 20 mA=0° C. . . . 200° C.)

$\vartheta_{Umgeb}$: ambient temperature of the clutch $\vartheta_{VTK}$: "true" (corrected) clutch temperature, indication also to operator $\Delta\vartheta/\Delta t$: temperature gradient (temperature rise), calculated according to formula 1 (see below)

$\Delta\vartheta_{Anfahr,min}$: required startup temperature difference, in order to be able to start the working machine under the actual current load $\vartheta_1$: max. operating temperature ($\vartheta_{B\,max}$), at which the load should be reduced $\vartheta_2$: temperature at which the load must be removed $\vartheta_3$: peak temperature ($\vartheta_{SP\,max}$) that leads to shutting down of the system Times/Timer (time counter)

$t_{Abschalt}$: timer, that is started on overheating (exceeding $\vartheta_3$)

$t_{Kühl}$: required cooling time after overheating of clutch 2 in order to be able to start it again is determined transaction-related and subject to the current load $t_{Start}$: timer, that is started at the start of the electric motor $t_{Überbrück}$: Startup suppression (for example until 300 l/min. is exceeded). If upon logic output (START E-MOTOR) the electric motor is not started immediately, that time has to be added.

$t_{Anlauf}$: max. startup time of the system, calculated from simulation and 10 s safety margin $t_{Block}$: timer, that is started upon recognition of startup/blockage $t_{Rest}$: resting time during blockage until shutting off of system $t_{n\vartheta1}$: timer that is started when exceeding $\vartheta_1$ $t_{n\vartheta2}$: timer, that is started when exceeding $\vartheta_2$ $t_{\text{Überbrück}}$: timer that is started for the first time during the transition of startup/blockage to nominal operation and simultaneous cooling Marker:

$M_{heiβ}$: marker, if system was shut off due to overheating (=1)

Formulas:

$$\Delta \vartheta / \Delta t = \frac{\vartheta_{BTM,t2} - \vartheta_{BTM,t1}}{t_2 - t_1};$$ Formula 1

$$t_2 = t_1 = 2s$$

$$\vartheta_{VTK} = (3 \cdot \Delta \vartheta / \Delta t) + 10K + \vartheta_{BTM}$$ Formula 2

$$\vartheta_{VTK} = (1.5 \cdot \Delta \vartheta / \Delta t) + 5K + \vartheta_{BTM}$$ Formula 3

$$t_{Rest} = \frac{\vartheta_3 - \vartheta_{VTK}}{\Delta \vartheta / \Delta t}$$ Formula 4 wherein: $t_1$: current point in time $\vartheta_{BTM,t1}$: temperature at point in time $t_1$ $t_2$: 2s before current point in time $\vartheta_{BTM,t2}$: temperature at point in time $t_2$ During the program sequence the following values are continuously loaded into analysis device 8:

$l_{BTM}\vartheta_{BTM}$: analogous BTM-output at output device (4 mA . . . 20 mA =0° C. . . . 200° C.)

$\vartheta_{Umgeb}$: Ambient temperature of clutch 2. If in specific application situation, temperatures of below 0° C. are excluded, this input can continuously be internally set in the program at >0° C.

$P_{Last}$: proportional current load of system. This value can be calculated at site, for example via the motor current, or can be input into the controller by the operating personnel as selector switch (120%, 100%, 90%, 80%, 70%, 60%). This input is required in order to adapt $t_{Kühl}$ and $\Delta\vartheta_{Anfahr,min}$ to the current load conditions (see table below). If this gradation is not desired, firm value $P_{Last}$=100% can be accepted.

Moreover, additional values are predetermined accordingly on the basis of size of drive train 1, or respectively the efficiencies of the turbo clutch 2 that are to be transferred and are stored in the region of analysis device 8.

$t_{\text{Überbrück}}$: Startup suppression (for example to a speed of 300 l/min. of exterior components).

$t_{Anlauf}$: max. startup time of the system, calculated from TurboSim plus 10 s safety margin $\vartheta_1$: max. operating temperature ($\vartheta_{B\ max}$), at which the load should be reduced $\vartheta_1$=95° C. with NBR seals (perbunan)

$\vartheta_1$=120° C. with FPM seals (Viton) for VTK≤750

$\vartheta_1$=105° C. with FPM seal (Viton) for>VTK 750

$\vartheta_2$: temperature at which the load must be completely removed. Meaningful gradation should hereby be selected between $\vartheta_1$ and $\vartheta_2$.

$\vartheta_3$: peak temperature ($\vartheta_{SP\ max}$) that leads to shutting down of the system $\vartheta_3 = \vartheta_{SSS}-15°$ C.

Communication between analysis device 8 and electric motor 3 as the primary drive machine is then typically very rudimentary, because only a start release or an immediate shutdown of electric motor 3 needs to be communicated.

With reference to one exemplary possible design, FIGS. 3A to 3D provide a detailed explanation of the sequence illustrated in the core of FIG. 2 on the basis of the described abbreviations and values. Below, only a few points are discussed in order to provide a better understanding of the drawings.

Figure 3A:
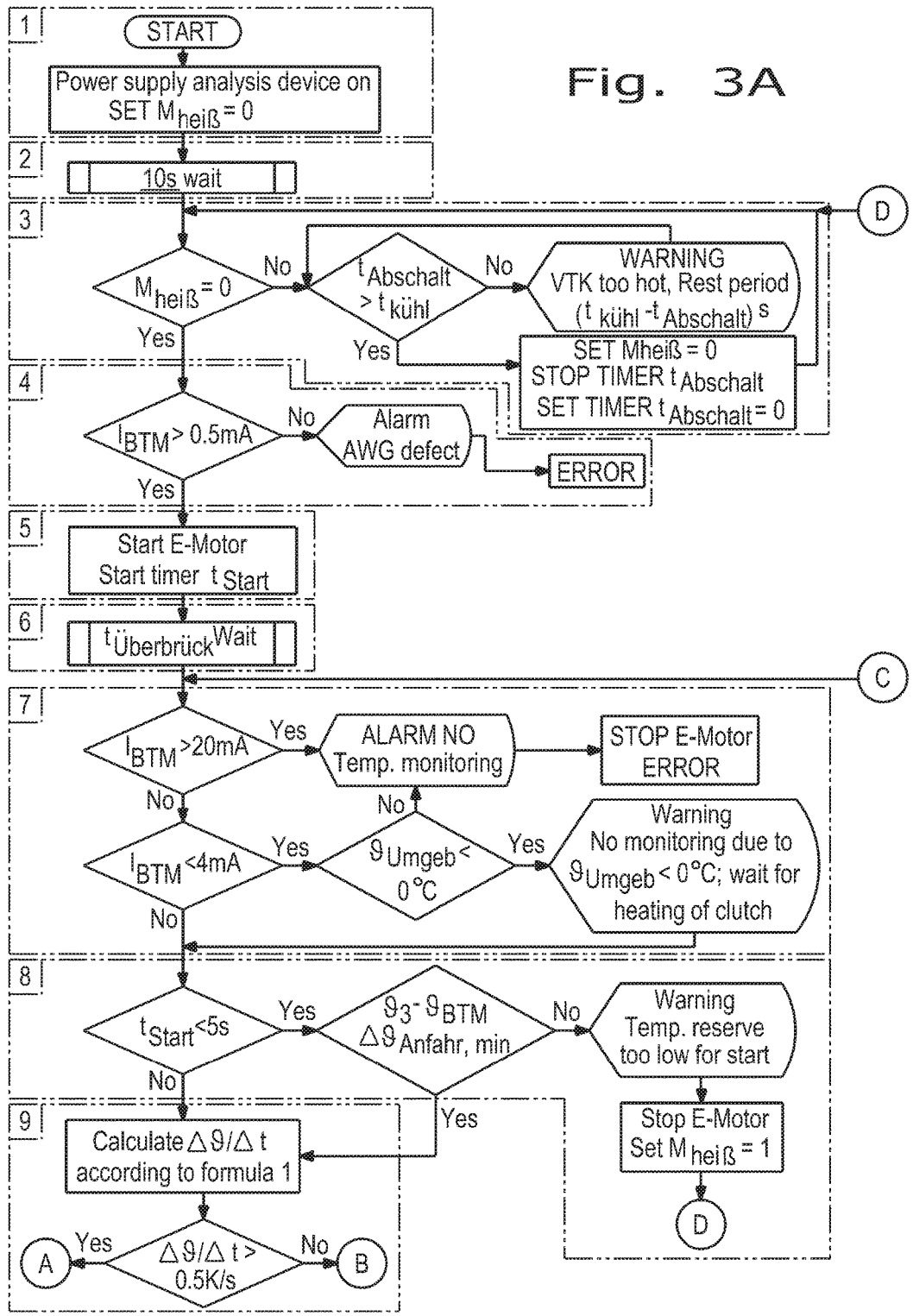
FIGS. 3A-D are the flow charts according to FIG. 2 in one possible detailed arrangement.

Steps 1 to 9 are again illustrated in FIG. 3A. Overall, the operation of drive train 1 starts with a start order, whereupon after turning on of the power supply in step 1, marker $M_{heiβ}$ is set to zero. In step 2 a time span of 10 seconds is observed before it is verified in step 3 whether marker $M_{heiβ}$ is set to zero, in other words if the starting procedure has been initiated shortly before or not. If this is not the case, step 3 is initiated typically via the region identified as D in the manner that is explained later; and, previously a temperature based shutoff of electric motor 3 occurred. In this case the shut-off timer is compared with the cooling timer, wherein the shut-off timer is started with the temperature based shut-off and the cooling timer is predetermined as a value in the manner described later.

Either a warning is issued that turbo clutch 2 is too hot and ideally, a resting period can be issued for the still required cooling. If the value of the shut-off timer is greater than the predetermined time value $t_{Kühl}$, then marker $M_{heiβ}$ is set to zero and timer $t_{Abschalt}$ is stopped and also set to zero. Step 3 is then restarted and, due to marker $M_{heiβ}$ having been set to zero, directly cycles through the first prompt. In step 4 the function of analysis device 8 is verified in that the base current value of contactless thermal measuring device 6 is retrieved. If this is higher than the predefined threshold value, everything is ok. If not, an alarm is issued accordingly and an error message is generated.

Electric motor 3 is subsequently started and a response threshold time is observed. In step 7 the plausibility of the temperature value of measuring device 6 is verified in that information is retrieved as to whether the current delivered via measuring device 6 is within a certain range. If this is the case, everything is ok. If this is not the case a warning is issued accordingly and electric motor 3 is again stopped. If the ambient temperature is too low, there is a wait for warming of the clutch or respectively the turbo clutch.

In step 8 a verification of the minimum startup temperature difference occurs for the first five seconds. If the temperature reserve is too low for starting, electric motor 3 is again stopped and marker $M_{heiβ}$ is set to 1. The system then returns to step 3. Otherwise a start occurs and a calculation of the temperature gradient occurs via formula 1.

In step 9 it is evaluated whether the temperature gradient is accordingly large or small, so that the events that are differentiated as A and B in step 9 can be selected. These events are the nominal operation (B) or respectively the operation during startup, or a blockage (A) as can be seen in the overview in the illustration in FIG. 2.

Figure 3B:
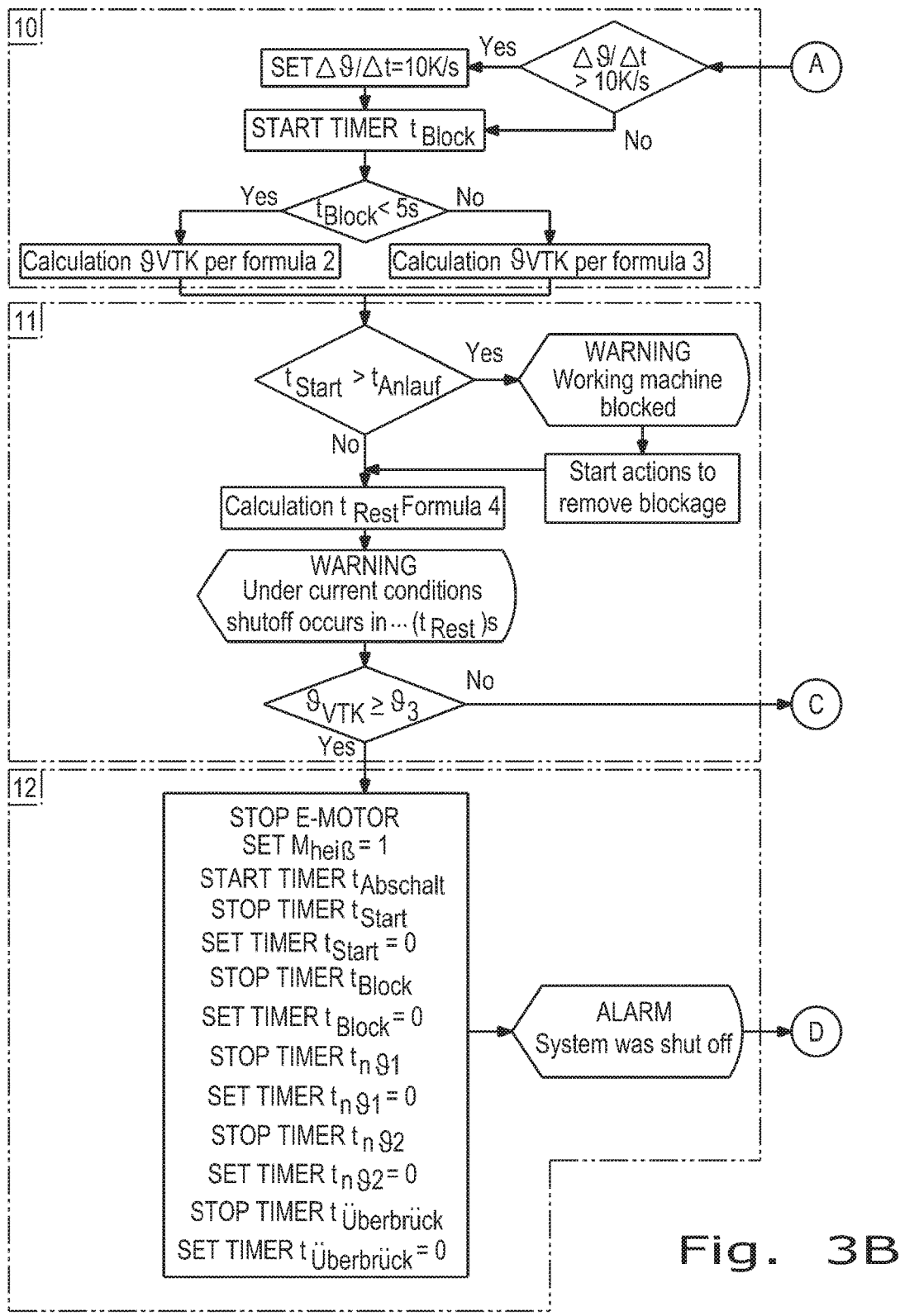

In FIG. 3B the sequence according to A is more clearly specified with steps 10, 11 and possibly 13. In step 10 it is again verified whether the temperature gradient exceeds a second threshold of 10 K/second. If this is the case it is set to 10 K/second. If this is not the case, timer $t_{Block}$ that otherwise would be started after the determination is started immediately. Via a time request, whether the timer is below or above 5 seconds a calculation of the temperature of the turbo clutch is performed, either according to formula 2 or formula 3.

In step 11 a related warning is issued in the case of a blockage and if necessary measures for removal of the blockage are initiated. Subsequently a rest period is calculated with formula 4 and a warning is issued, so that under the momentary conditions the shutdown occurs in the value that was calculated by way of the resting period value. Subsequently, a verification occurs as to whether the temperature of the clutch has in fact exceeded the maximum temperature limit value $\vartheta_3$. If this is not the case, return to point C is between points 6 and 7 occurs.

If this is the case, then electric motor 3 is shut off in step 13 and the relevant timers are set according to the illustration in FIG. 3B. After output of an alarm we return to step 3, so that after a sufficient cooling a renewed start of electric motor 3 can occur.

Figure 3C:
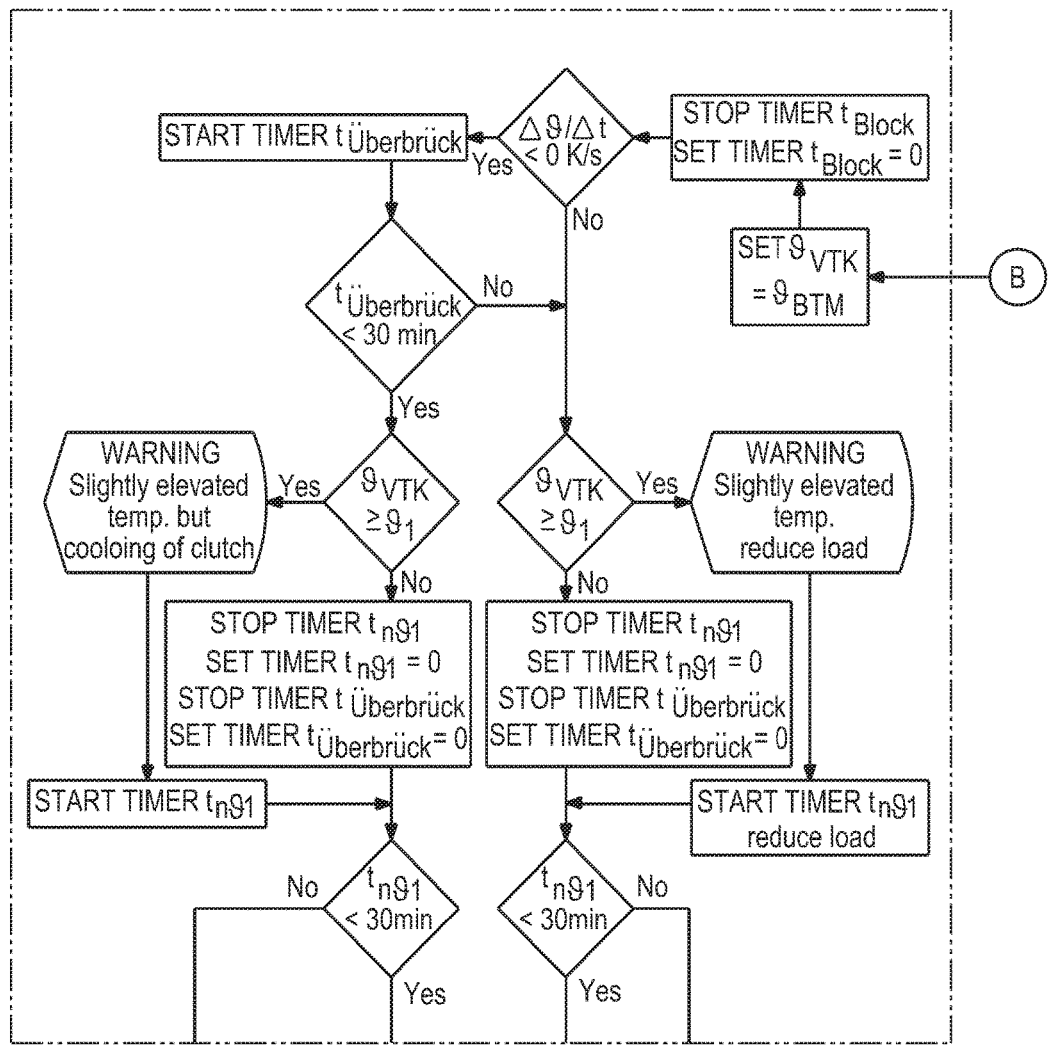
Figure 3D:
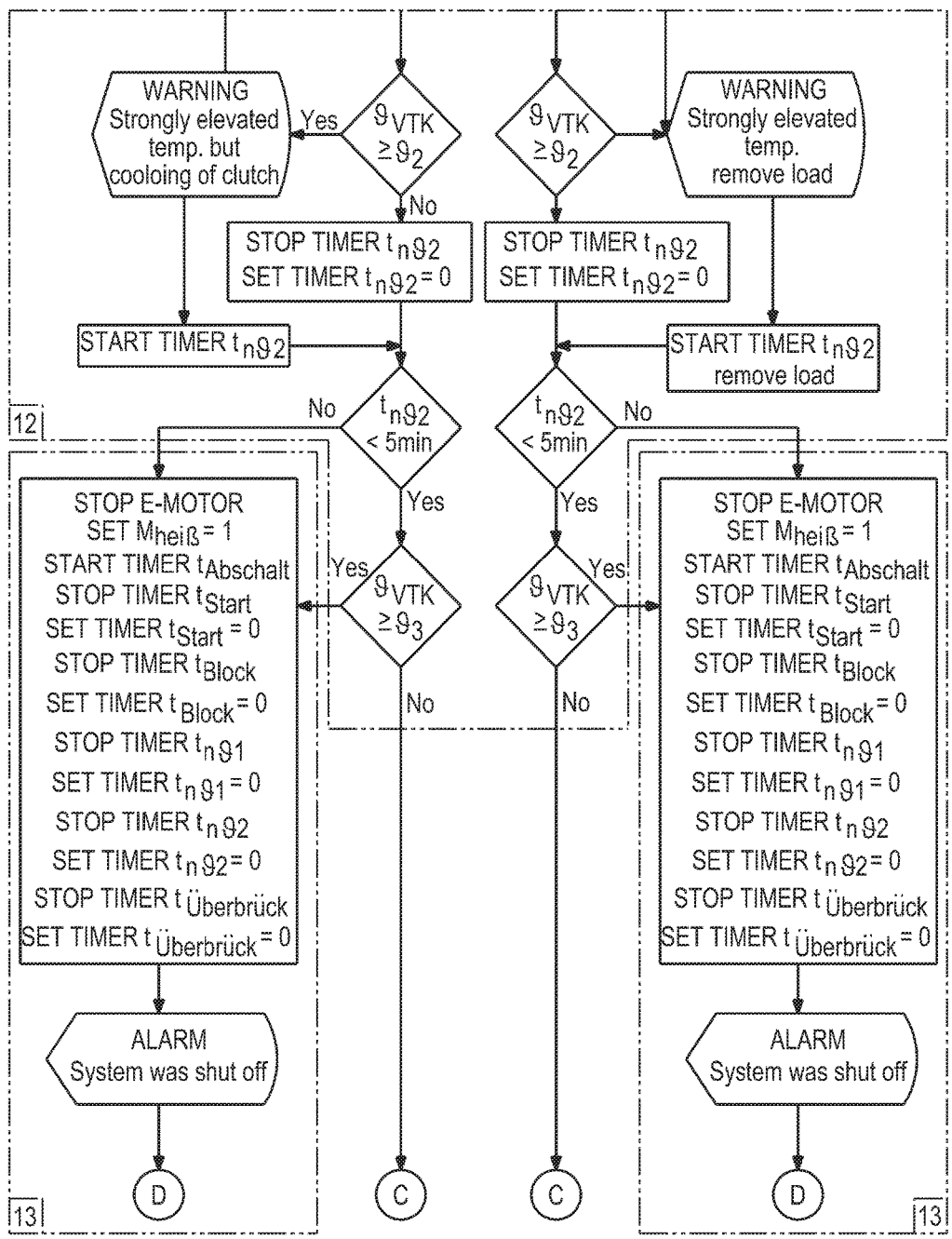

In the illustration in FIG. 3C, monitoring for the nominal operation is described. Here, essentially temperature monitoring occurs that differentiates between lightly elevated temperature with the necessity to reduce the load, and a strongly elevated temperature with the necessity to completely remove the load. Only if no appropriate measure occurs, step 13 for stopping of electric motor 3 analogous to the illustration in FIG. 3D is activated; otherwise the sequence between steps 6 and 7 is restarted and continuously cycled through.

In order to determine the predefined time value $t_{Kühl}$ the situation described below is for example implemented, in particular subject to the load. This can occur for different load conditions and thus always leads to different results. The method in the example in FIGS. 4 and 5 is exemplary only for the load of 100%.

Figure 4:
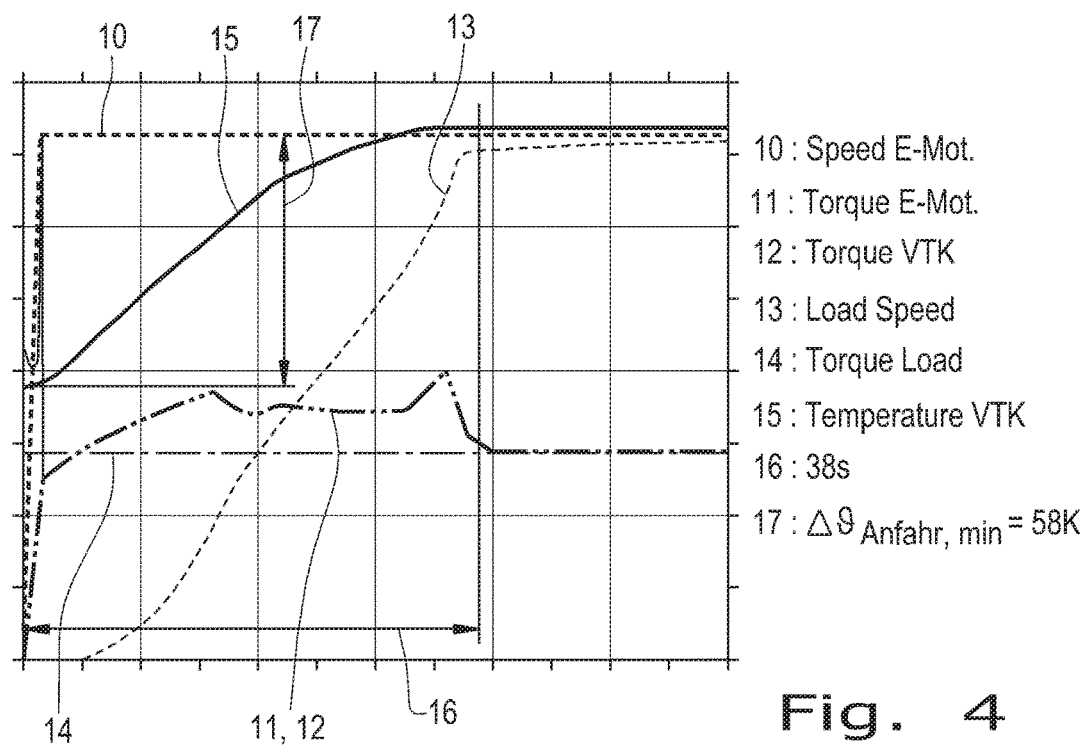
FIG. 4 is a diagram showing the simulation of a run-up of the drive train.

Several individual curves can be seen in the diagram in FIG. 4. For example, the motor speed 10 and motor torque 11, as well as secondary torque of turbo clutch 2 are illustrated. Moreover, recognizable in FIG. 4 is a curve 13 of the load speed, as well as a curve 14 with the load torque. Decisive for the therein illustrated view is in particular temperature progression 15 in turbo clutch 2. It can be seen that during the startup process the speed increases quickly from the left end of the diagram and the torque that is transferred to turbo clutch 2 also increases until it levels off in the range of load torque 14 after completed process. This start process or respectively start-up is indicated in the illustration in FIG. 4 with arrow 16 and lasts for example 38 seconds.

At the same time, it can be observed that the temperature at the far left in the diagram rises to a constant temperature value during regular operation. This rise in temperature is indicated with arrow 17 and identifies the required starting temperature $\Delta\vartheta_{Anfahr,\ min}$ that, in the illustrated design example amounts to 58 K. Additional values, for example the ambient temperature of the turbo clutch and the starting temperature of the turbo clutch during shut-off due to reaching the maximum temperature $\vartheta_3$ are thereby included into the simulation illustrated in FIG. 4.

Figure 5:
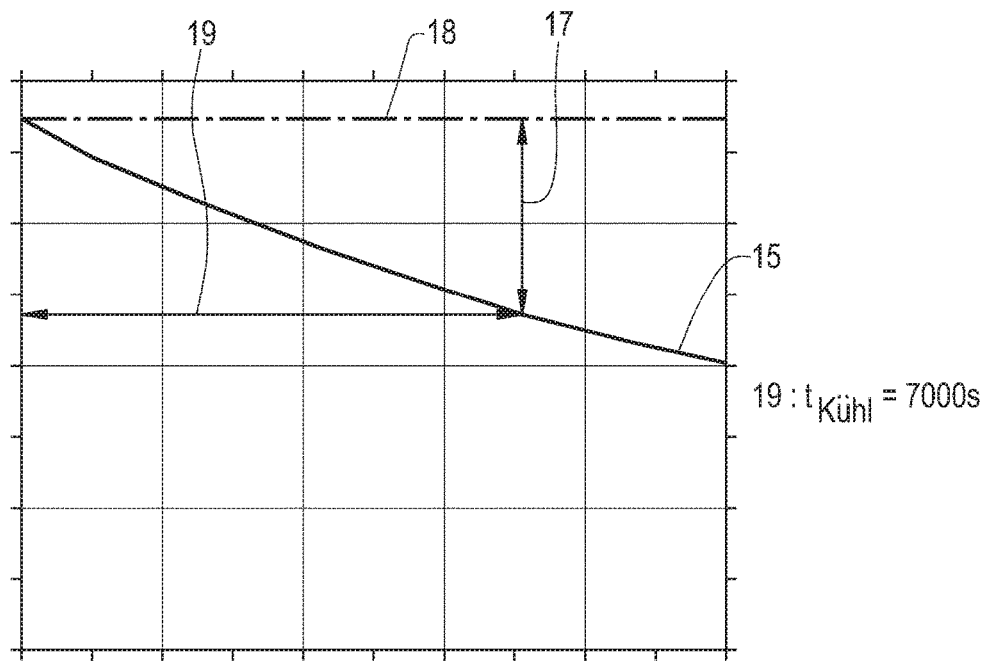
FIG. 5 is a diagram showing the simulation of the cooling behavior of the drive train.

In an additional simulation in the illustration in FIG. 5 the cool-down behavior of turbo clutch 2 can now be recognized. The curve of turbo clutch 2 is again identified with reference 15 and the permissible operating temperature of turbo clutch 2 with the predefined load—in this case 100%—is identified with reference 18. Temperature curve 15 shows the simulated cooling of turbo clutch 2 under the described conditions. The startup temperature difference $\Delta\vartheta_{Anfahr,\ min}$ of 58K is again shown by arrow 17 which means that cooling by at least 58K compared to the permissible temperature 18 of turbo clutch 2 has to have been at least 58K in order to not provoke renewed overheating and shutoff or respectively load reduction on turbo clutch 2 during startup. If this value is entered into the diagram, a respective value results for the respective point on the temperature progression time axis that is also indicated by arrow 19. This is the predefined time value $t_{Kühl}$ that, in this illustrated design example is 7000 seconds.

In the inventive method therefore, value $t_{Kühl}$ is predefined with 7000 seconds in step 3 of the sequence. This means that timer $t_{Abschalt}$ has had to have run already for 7000 seconds before a renewed start of electric motor 3 according to the provided logic diagram becomes possible. Based on this specification, maximum uptime of the system is made possible, and starting attempts that lead again immediately to a shut-off and thus ultimately to prolongation of the overall duration during which the system is not available or not completely available can be prevented.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating a drive train, comprising:
   providing a primary drive machine;
   providing a working machine driven by the primary drive machine;
   providing a hydrodynamic clutch between the primary drive machine and the working machine; and
   providing a temperature detection device for detecting a temperature in the hydrodynamic clutch;
   detecting the temperature of the hydrodynamic clutch at the time of a change from at least one of a load state and an operating state of the drive train to at least one of a new load state and a new operating state of the drive train;
   calculating an expected temperature progression on the basis of the detected temperature and at least one of the new load state and the new operational state of the drive train; and
   issuing at least one of a warning signal and a stop signal for the primary drive machine if a temperature of the calculated temperature progression exceeds a predetermined maximum temperature within the expected duration of at least one of the new load state and the new operational state.

2. The method according to claim 1, wherein at least one of a warning signal and a stop signal for the primary drive machine is issued if the current temperature becomes greater than its respective value in the calculated temperature progression.

3. The method according to claim 1, wherein in the case of a change of the operating state from a turned-on to a shut-off state of the primary drive machine, based on the load state at the time of the shut-off, additionally a start-up temperature progression of a warm-up in the case of a start-up of the drive train is calculated from which a maximum start-up temperature difference is determined; wherein before release of a new start of the drive train, a wait occurs until the calculated temperature progression has reached a release temperature that falls below the maximum temperature by at least the startup temperature.

4. The method according to claim 3, wherein reaching the release temperature occurs by way of a comparison of the current detected temperature with the correlative value of the calculated temperature progression.

5. The method according to claim 3, wherein reaching the release temperature is monitored by a time counter; wherein upon shut-off, the time counter is started; wherein during a new start of the primary drive machine it is first verified whether the time counter has reached a time value at which the calculated temperature progression reaches the release temperature.

6. The method according to claim 3, wherein reaching the release temperature is monitored by a time counter; wherein upon shut-off, the time counter is started; wherein during a new start of the primary drive machine it is first verified whether the time counter has reached a time value that is referenced subject to at least one of an ambient temperature, a temperature at the time when the drive train is shut off, and a load of the working machine in characteristic curves or characteristic fields of at least one of previous measurements and simulation values.

7. The method according to claim 1, wherein when calculating the temperature progression, the ambient temperature of the hydrodynamic clutch is considered.

8. A method for operating a drive train, comprising:
providing a primary drive machine;
providing a working machine driven by the primary drive machine;
providing a hydrodynamic clutch between the primary drive machine and the working machine; and
providing a temperature detection device for detecting a temperature in the hydrodynamic clutch:
detecting the temperature of the hydrodynamic clutch at the time of a change from at least one of a load state and an operating state of the drive train to at least one of a new load state and a new operating state of the drive train;
calculating an expected temperature progression on the basis of the detected temperature and at least one of the new load state and the new operational state of the drive train; and
issuing at least one of a warning signal and a stop signal for the primary drive machine if a temperature of the calculated temperature progression exceeds a predetermined maximum temperature within the expected duration of at least one of the new load state and the new operational state, wherein the current temperature value that is detected by the temperature detection device is corrected with a temperature value, subject to the occurring temperature gradients.

9. The method according to claim 8, wherein the correction value is selected proportional to the temperature gradient.

10. A method for operating a drive train, comprising:
providing a primary drive machine;
providing a working machine driven by the primary drive machine;
providing a hydrodynamic clutch between the primary drive machine and the working machine; and
providing a temperature detection device for detecting a temperature in the hydrodynamic clutch:
detecting the temperature of the hydrodynamic clutch at the time of a change from at least one of a load state and an operating state of the drive train to at least one of a new load state and a new operating state of the drive train;
calculating an expected temperature progression on the basis of the detected temperature and at least one of the new load state and the new operational state of the drive train; and issuing at least one of a warning signal and a stop signal for the primary drive machine if a temperature of the calculated temperature progression exceeds a predetermined maximum temperature within the expected duration of at least one of the new load state and the new operational state, wherein as of a maximum operating temperature, the load on the hydrodynamic clutch is reduced by a decrease in at least one of a drive power and a load, wherein a maximum operating temperature is less than a maximum temperature.

11. The method according to claim 10, wherein with a warning temperature that is predefined greater than the maximum operating temperature and lower than the maximum temperature, a complete reduction of the load occurs.

12. The method according to claim 1, wherein the hydrodynamic clutch is protected by a fusible safety plug that is designed for a temperature above the maximum temperature.

13. The method according to claim 1, wherein the measurement of a temperature of the hydrodynamic clutch occurs via a measurement in the hydrodynamic clutch and a contactless transfer of a measured value into a stationary analysis unit.

* * * * *